United States Patent
Mezhibovsky et al.

(10) Patent No.: US 10,645,226 B2
(45) Date of Patent: May 5, 2020

(54) SYSTEM AND METHOD FOR INTERACTION CALLBACK PACING

(71) Applicant: Genesys Telecommunications Laboratories, Inc., Daly City, CA (US)

(72) Inventors: Vladimir Mezhibovsky, San Francisco, CA (US); Nikolay Korolev, Concord, CA (US); Herbert Ristock, Walnut Creek, CA (US)

( * ) Notice: Subject to any disclaimer, the term of this patent is extended or adjusted under 35 U.S.C. 154(b) by 31 days.

(21) Appl. No.: 15/087,511

(22) Filed: Mar. 31, 2016

(65) Prior Publication Data

US 2017/0289355 A1   Oct. 5, 2017

(51) Int. Cl.
*H04M 3/523* (2006.01)

(52) U.S. Cl.
CPC ....... *H04M 3/5231* (2013.01); *H04M 3/5238* (2013.01)

(58) Field of Classification Search
CPC .......................... H04M 3/5231; H04M 3/5238
USPC ..................................................... 379/266.06
See application file for complete search history.

(56) References Cited

U.S. PATENT DOCUMENTS

| | | | | |
|---|---|---|---|---|
| 6,724,885 B1* | 4/2004 | Deutsch | ................... | H04M 3/48 379/209.01 |
| 8,155,297 B1* | 4/2012 | Dhir | ................... | H04M 3/42195 379/210.01 |
| 8,345,852 B2* | 1/2013 | Famous | ................ | H04M 3/5231 379/210.01 |
| 9,319,521 B1* | 4/2016 | Chan | ....................... | H04M 1/64 |
| 2003/0002653 A1* | 1/2003 | Uckun | ..................... | H04M 3/51 379/266.06 |
| 2003/0235287 A1 | 12/2003 | Margolis | | |
| 2006/0167729 A1* | 7/2006 | Rafter | .................... | G06Q 10/00 705/7.16 |
| 2010/0091971 A1 | 4/2010 | Famous | | |
| 2010/0158220 A1* | 6/2010 | Silverman | ......... | H04M 3/42195 379/88.22 |
| 2012/0099721 A1* | 4/2012 | Peterson | ............... | H04M 3/523 379/266.01 |
| 2013/0060587 A1* | 3/2013 | Bayrak | ................... | G06Q 10/10 705/7.11 |
| 2013/0322615 A1* | 12/2013 | Oristian | .............. | H04M 3/5232 379/266.06 |
| 2016/0065739 A1 | 3/2016 | Brimshan et al. | | |
| 2016/0295020 A1* | 10/2016 | Shaffer | ................ | H04M 3/5235 |

FOREIGN PATENT DOCUMENTS

KR   1020090049556 A   5/2009

OTHER PUBLICATIONS

International Search Report and Written Opinion for Application No. PCT/US2017/025176, dated Jul. 11, 2017, 15 pages.

\* cited by examiner

*Primary Examiner* — Ahmad F. Matar
*Assistant Examiner* — Jirapon Intavong

(57) ABSTRACT

A system includes a processor and a memory. The memory stores instructions, which when executed by the processor, causes the processor to receive a request for an interaction with an agent device. The processor determines a patience time threshold for the customer in response to the request for an interaction. The processor suggests to return to the interaction at a time based on the patience time threshold, and performs the return interaction by the agent device based on the determination.

10 Claims, 7 Drawing Sheets

SYSTEM AND METHOD FOR INTERACTION CALLBACK PACING

BACKGROUND

Contact centers can handle sales, service and technical support for businesses offering products and or services to their customers and potential customers. Current communications methods in place in contact centers may focus on individual contacts and manage those contacts individually from the standpoint of incoming and proactive interaction campaigns.

BRIEF DESCRIPTION OF THE DRAWINGS

In association with the following detailed description, reference is made to the accompanying drawings, where like numerals in different figures can refer to the same element.

DETAILED DESCRIPTION

A system and method for contact centers can provide optimizations for interaction pacing engines. For example, a pacing engine can determine preferred wait times for inbound calls waiting in a queue to be handled, offer determined callback times, and/or determine when to make callbacks. The pacing engines can help reduce instances of customers abandoning interactions making their way to agent devices at contact centers. For example, a customer may abandon an interaction with a contact center when a wait time is too long and/or by not answering a callback from the contact center. The pacing engine can determine interactions for which to offer callbacks to customers and/or determine preferred times to perform the callback to the customer. The term callback can generally refer to getting back to the customer using one or more of various types of channels, including but not limited to, voice calls, chats, emails, interaction via websites, mail, etc. Additionally or alternatively a call can include one or more types of interactions, including but not limited to voice calls, chats, emails, interaction via websites, mail, etc.

Figure 1:
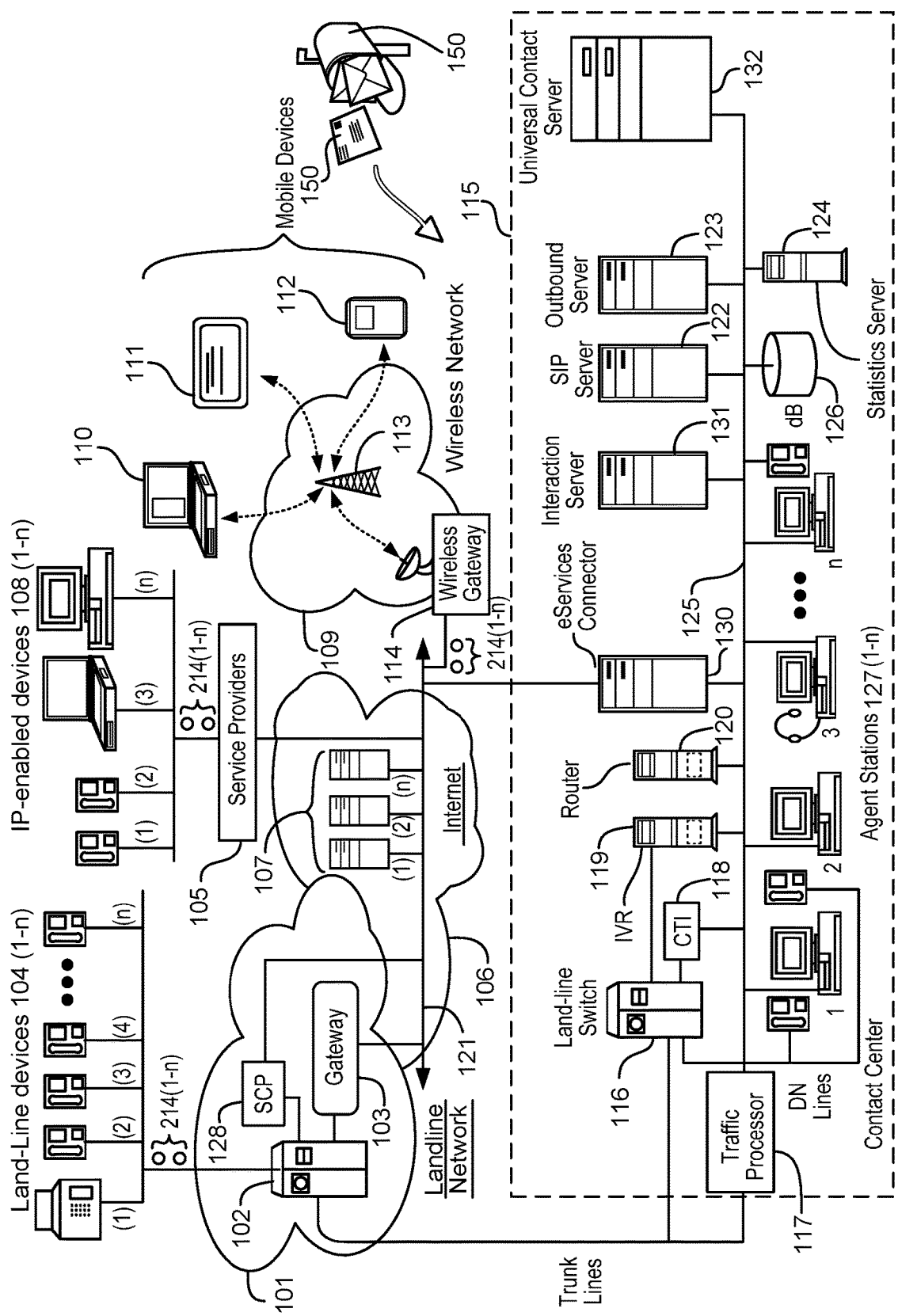
FIG. 1 is a block diagram illustrating an example contact center and a plurality of networks with interconnections where customers and agents may interact via a contact center.

FIG. 1 is a block diagram illustrating a contact center 115 and a plurality of networks 101, 106, 109 with interconnections where customers and agents may interact via the contact center 115. Contact center 115 can be hosted by an enterprise that employs one or more contact centers. In one example, the contact center 115 can implement services in the cloud environment. For example, the contact center 115 can utilize hypertext transfer protocol (HTTP) elastic load balancing (ELB) provided by AMAZON WEB SERVICES, INC. (AWS). Other non-limiting services provided by the cloud can include computing and storage, service reliability and security, external connectivity, etc.

Customers and agents may perform interactions 100(1-n) with contact center 115 through communication appliances including land-line devices, e.g., telephones and facsimile machines 104 (1-n), IP-enabled devices 108 (1-n), through mobile appliances 110, 111 or 112, through the postal mail 150, etc. The term customers includes potential customers and other users of the contact center 115. Interactions 100(1-n) can be accomplished via incoming and outgoing voice, text, email, messaging, chat, facsimiles, mailed letters, and so on. The interaction server 131 can serve interactions 100(1-n) to agents based on priority, e.g., via gold, silver, bronze and/or other service level agreements (SLA's), in which higher priority interactions 100(1-n) are served first.

Persons interacting through land-line devices 104 may connect firstly over trunk lines to a network switch 102. Switch 102 may interact with hardware and software of a Service Control Point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a traffic processor 117. A contact center 115 may operate with the land-line switch or the traffic processor, but in some circumstances may employ both incoming paths. Traffic processor 117 may provide session border controller (SBC) functionality, and may operate as a media gateway, or as a softswitch, e.g., a software switch.

Persons interacting through IP-enabled devices 108(1-n) may interact through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as SKYPE or other VoIP solutions based on technologies such as WEBRTC. Similarly appliance 108(n) illustrated as a desktop computer, may interact over the Internet in much the same manner as laptop appliance 108(3).

Many IP-enabled devices provide capability for customers to interact both in voice interactions 100(1-n) and text interactions 100(1-n), such as email and text messaging services and protocols. Internet network 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which customers may leverage in interaction with a contact center such as contact center 115.

Another arrangement by which customers and agents may interact with contact centers is through mobile devices, illustrated in FIG. 1 by devices 110, 111 and 112. Such devices may include, but are not limited to laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices, e.g., devices 110, 111 and 112, may connect to supplemental equipment. For example, cellular smartphones may be enabled for near-field communication such as BLUETOOTH, and may be paired with equipment in an automobile, which may in turn connect to the Internet network through satellite equipment and services, such as ON-STAR. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

The contact center 115 may represent one of a plurality of federated contact centers, a single center hosted by a single enterprise, a single contact center operating on behalf of a plurality of host enterprises, or any one of a variety of other arrangements. Architecture of an individual contact center 115 may also vary, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implemented with a GENESYS TELECOMMINATION SYSTEMS, INC. T-server. Calls may be queued in any one of a variety of ways before connection to an agent, either locally-based or remote from the contact center, depending on circumstances.

Incoming land-line calls to switch 116 may also be connected to an IVR server 119, which may serve to ascertain purpose of the caller and other information useful in further routing of the call to final connection, if further routing is needed. A router 120 may be leveraged for routing intelligence, of which there may be a great variety, and for association of the instant call with previous calls or future calls that might be made. The router 120 can be mapped to a GENESYS TELECOMMINATION SYSTEMS, INC. orchestration routing server, a universal routing server (URS) and/or a conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127. Agent station 127(3) is illustrated as having a connected headset from a computing device, which may execute telephony software to interact with packet switched calls. Agent station 127(n) is illustrated as having an IP-enabled telephone connected to LAN 125, through which an agent at that station may connect to packet-switched calls. Agent stations 127(1-n) may have a computerized appliance executing software to enable the using agent to transact by voice, email, chat, instant messaging, and any other known communication process.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions, co-browsing sessions, and more.

The Interaction Server 131 may leverage services of other servers in the contact center, and available remotely as well. For example, SMS and email can be processed by a universal contact server 132 which interfaces with a database to store data on contacts, e.g., customers, including customer profiles and interaction history. The customer profile can include information about a level of service that the customer's interactions 100(1-n) are to receive, e.g., for distinguishing a customer segment (gold/silver/bronze) a particular interaction belongs to.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB 126 may be provided to archive interaction data and to provide storage for many of the activities in contact center 115. An outbound server 123 is illustrated and may be used to manage outbound campaigns in the contact center, wherein calls may be made to destinations from a campaign list, and answered calls may be connected directly or be queued to be connected to agents involved in the outbound campaigns.

The contact center 115 and connectivity of the networks 101, 106, 109 through which transaction is accomplished between customers and agents is exemplary, and there are a variety of ways that similar functionality might be attained with somewhat different architecture. The architecture illustrated is exemplary.

Contact centers may operate with a wide variety of media channels for interaction between agents and customers who call in to the centers. Such channels may enable voice interaction in some instances, and in other instances text-based interaction, which may include chat sessions, email exchanges, and text messaging. Mail and email are examples of interactions 100(1-n) for an agent to engage in some particular future or scheduled time.

Figure 2:
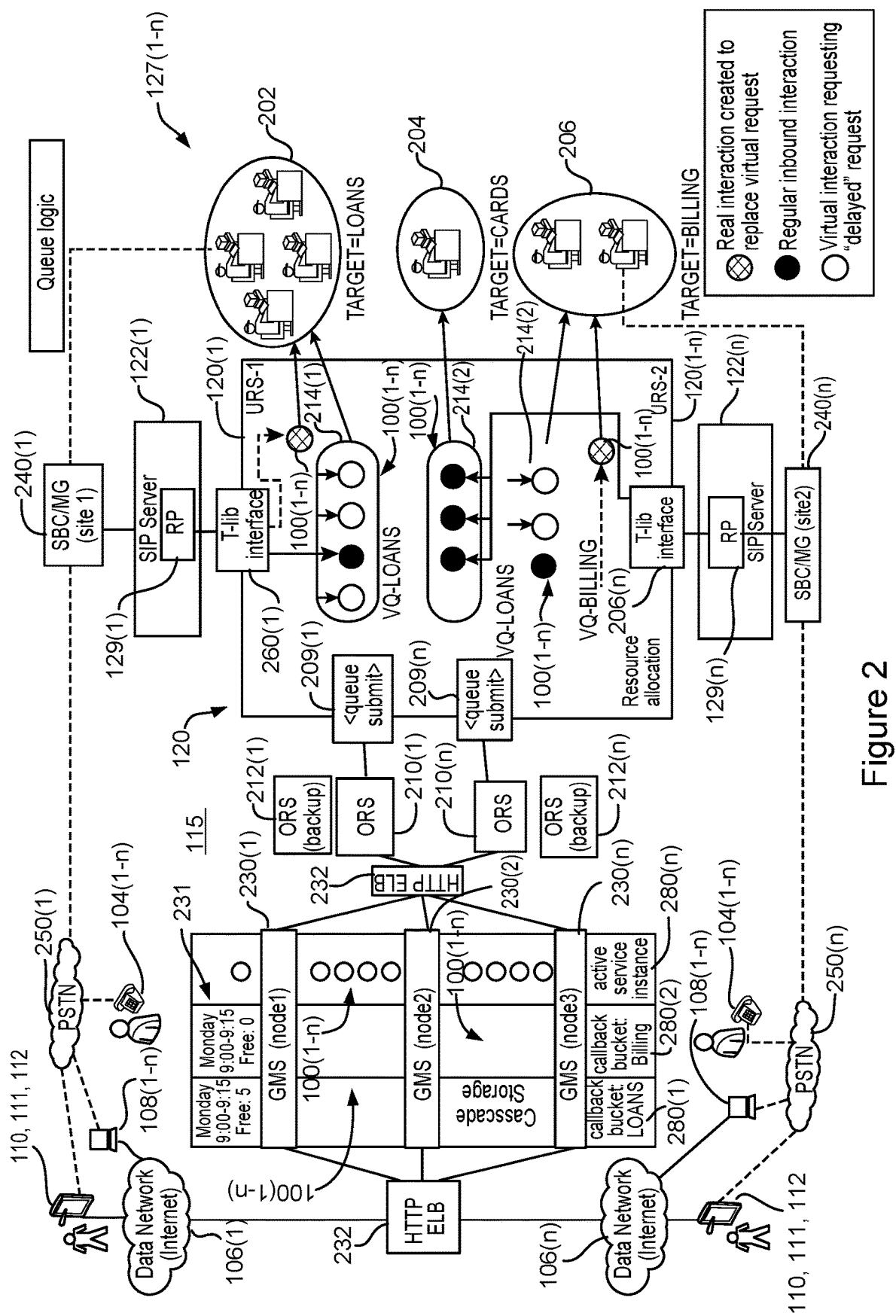
FIG. 2 is a block diagram of an example architecture of the contact center for queuing interactions to agent stations.

FIG. 2 is a block diagram of an example architecture of the contact center 115 for queuing interactions 100(1-n) to agent stations 127(1-n). The agents of the agent stations 127(1-n) can be grouped, e.g., by specialty, including in the banking context one or more loan groups 202, credit card groups 204 and billing groups 206, etc. Agent stations 127(1-n) may belong to one or more groups 202, 204, 206, e.g., based on skill. The agent stations 127(1-n) are served interactions 100(1-n) by the routers 120(1-n) as the interactions 100(1-n) make their way through the queues 214(1-n). In some implementations queues can be separated by type. Examples of different types of queues 214(1-n) can include a virtual loan queue 214(1), a virtual credit card queue 214(2), a virtual billing queue 214(n), etc. The interactions 100(1-n) can make their way through the queues 214(1-n) as regular inbound interactions, virtual interactions representing a delayed request, and real interactions created to replace a virtual interaction, e.g., for a callback, etc. Other designations for the interactions 100(1-n) can be used, e.g., based on an implementation.

Interactions 100(1-n) waiting for callback connections can be grouped into buckets 208(1-n). The buckets 208(1-n) can group interaction by type, e.g., loans 208(1), billing 208(2) and active service instances 208(n). The ORSs 210 (1-n) receives the interactions 100(1-n) for callbacks from the queues 214(1-n), e.g., via the queue submit interfaces 209(1-n). The callbacks can occur through the data networks 106(1-n) via a protocol, e.g., HTTP ELB 232. The connections through the data networks 106(1-n) can include access to calendars of the customers to schedule callbacks, e.g., minutes, hours or days, etc., from the original call. Information 231 about the scheduled day, time and available agent devices 127(1-n) can be stored in the buckets 208(1-n) so that the queues 208(1-n) do not become overloaded. The buckets 208(1-n) can be implemented with CASSANDRA storage or another type of database, whether distributed or not.

The routers 120(1-n) can connect with the orchestrations servers (ORS) 210(1-n) and ORS backups 212(1-n). The ORSs 210(1-n) can connect with integration platform gateway nodes 230(1-n), in one example implemented by GENESYS MOBILE SERVICES (GMS), which provide inbound voice routing and application programming interfaces (APIs) that customers can access through the Internet and/or be deployed into customer network infrastructures. The integration platform nodes 230(1-n) can send/receive information to/from mobile devices 110, 111, 112 and IP-enabled devices 108(1-n) via data networks, e.g., Internet networks 106(1-n), using HTTP ELB 232 or other protocol.

Communications to/from the land-line devices 104(1-n) can be routed by public switched telephone networks (PSTN) 250(1-n) to SIP servers 122(1-n) via session border controller (SBC)/media gateway (MG) sites 240(1-n). The SIP servers 122(1-n) can communicate to the routers 120 (1-n) via T-Library interfaces 260(1-n), or other protocol interfaces. The SIP server 122(1-n) can include corresponding route points (RP) 129(1-n) to control routing of the calls and other types of interactions in the contact center 115.

Figure 3A:
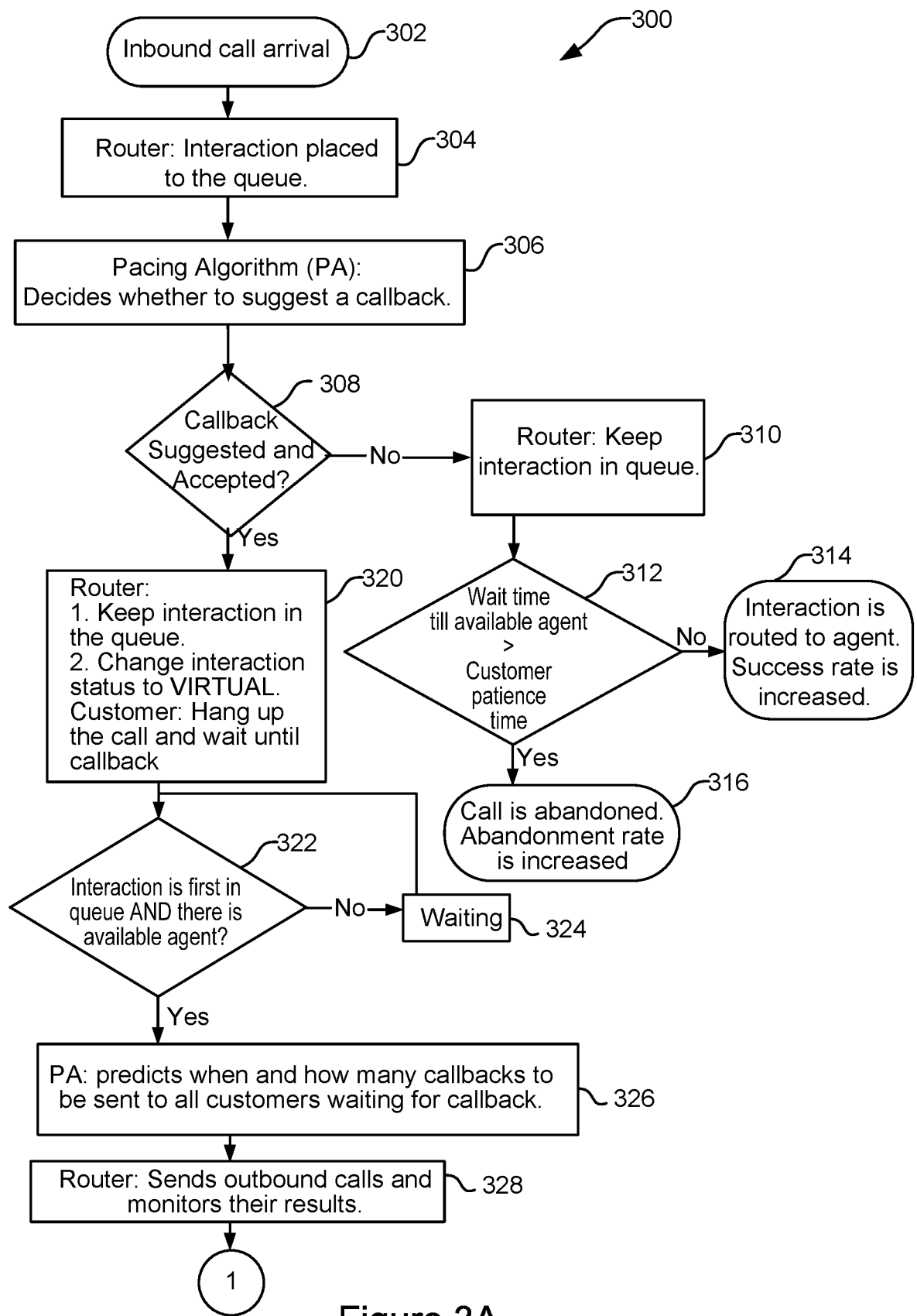
FIGS. 3A-B are a flowchart of an example logic for routing interactions according to the architecture of the contact center.
Figure 3B:
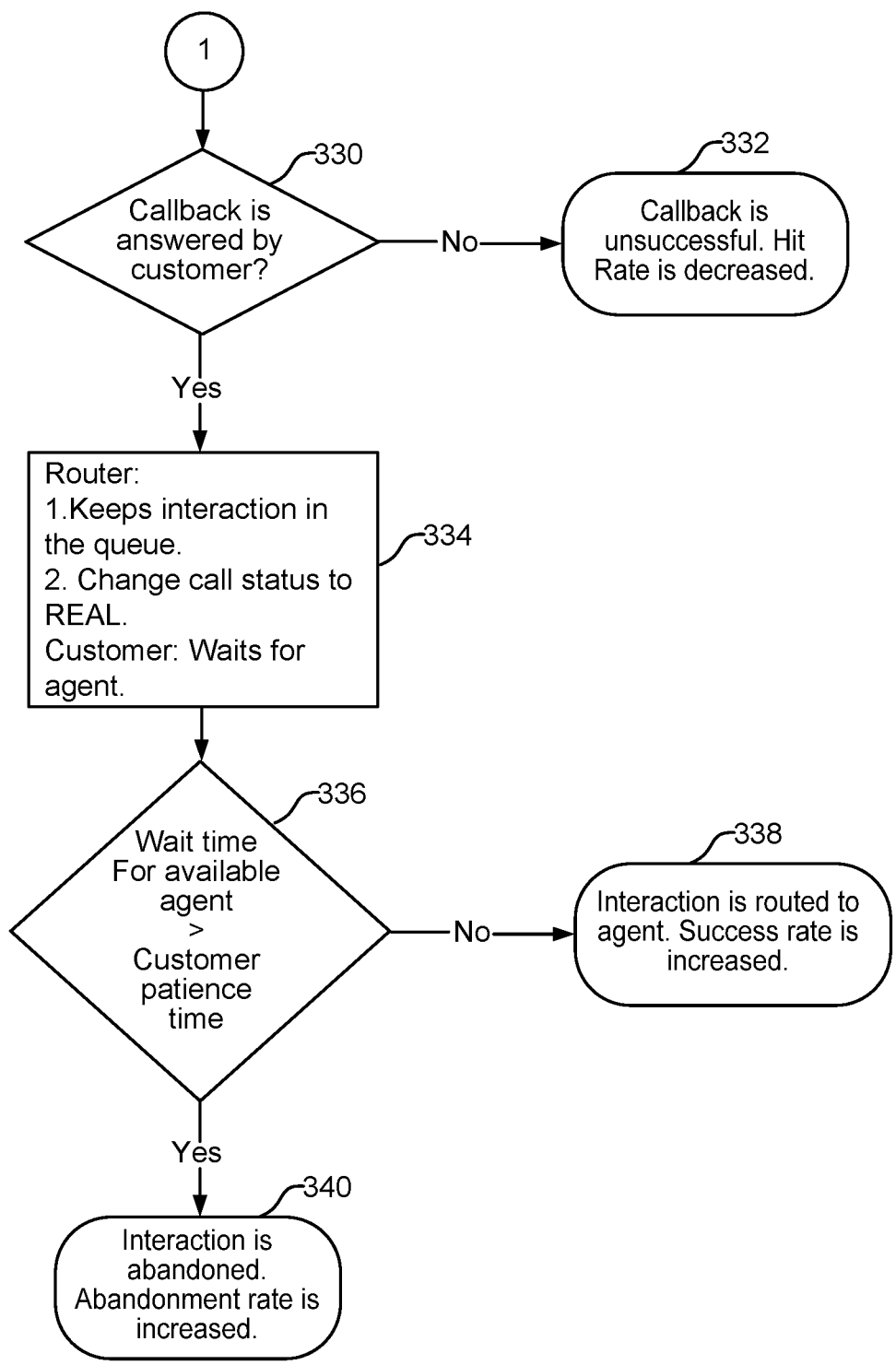

FIGS. 3A-B are a flowchart 300 of an example logic for routing interactions 100(1-n) according to an architecture of the contact center 115. When an interaction 100(1-n) arrives at the contact center 115 (302) the router 120(1-n) places the interaction in one or more of the queues 214(1-n). A pacing logic of the router 120(1-n) determines whether to suggest a callback to the customer via phone, chat, email or other media (306). The router 120(1-n) can predict for incoming interactions 100(1-n) when a callback service is suggested, e.g., by taking into account parameters described below. Additionally or alternatively, the router 120(1-n) can determine what time the callback can be made, or range of times, to the customer. The customer can be informed of the time of the callback. These optimizations can improve a performance of the contact center 115, e.g., by reducing number of lost customers waiting in the queue while balancing a risk of losing the customers if they do not answer the callback, and/or increasing the agent occupancy.

In one example, a callback can be suggested or not based on whether or not a group 202, 204, 106 of the agent stations 127(1-n) is overloaded (308). The router 120(1-n) can process a number of available agent stations 127(1-n), a number of interactions 100(1-n) waiting in the queues 214(1-n), a time for the agent stations 127(1-n) to handle the interactions 100(1-n), a wait time of the customer for the interactions 100(1-n) entering the queues 214(1-n), a customer patience time based on a type of interactions 100(1-n), etc. Whether or not to suggest a callback can occur on an interaction by interaction basis or for a group of interactions, etc., based on an implementation. If the router 120(1-n) does not suggest a callback for an interaction of the interactions 100(1-n) the router 120(1-n) maintains the regular interaction in the queue 214(1-n). If the wait time for an available agent station 127(1-n) is less than or equal to the customer's patience time (312) the interaction 100(1-n) is routed to the agent station 127(1-n) to handle the interaction 100(1-n) and a success rate indicator is increased (314). Since this is a statistical value the contact center 115 can offer also a callback earlier than the exact estimated waiting patience time, and/or for other reasons including shifting traffic to a less busy time. The contact center 115 can weigh a risk that customer might not accept the callback offer, e.g. an over-offering logic might be implemented.

If the wait time for an available agent station 127(1-n) is greater than the customer's patience time (312) the interaction 100(1-n) the customer abandons the interaction and an abandonment rate is increased (316). The router 120(1-n) can utilize the success rate indicator and abandonment rate indicator to aid with future determinations on whether or not to suggest a callback (308).

If the router 120(1-n) suggests a callback and the customer accepts the callback offer for an interaction of the interactions 100(1-n) (308), the router 120(1-n) maintains the interaction in its place in the queue 120(1-n), changes the call status to virtual and allows the customer to stop monitoring a status of the interaction, e.g., hang up the call or close the website, etc., and wait for a callback (320). The router 120(1-n) can provide a determined callback time to the customer, e.g., based on a determination of availability of the agent station 127(1-n). The router 120(1-n) determines when the interaction is first in the queue 214(1-n) and there is an available agent station 127(1-n) (322). If the interaction is not first in the queue 214(1-n) or there is no available agent station 127(1-n), the router 120(1-n) waits to place the interaction with an agent station 127(1-n) (324). The router 120(1-n) predicts when and how many callbacks to be sent to the customers waiting for a callback (326).

Two types of callback scheduling include as soon as possible (ASAP) scheduling and on time scheduling. Other types are possible. For example, the router 120(1-n) can provide a scheduled time interval rather than an exact time to call back, e.g., a callback between 4 and 4:30 pm, This can give more flexibility at the contact center 115 to fine tune actual callback time in accordance with agent station 127 (1-n) occupancy. For ASAP scheduling the interaction of the interactions 100(1-n) continues to stay in the same queue 214(1-n) and its status becomes virtual. The contact center 115 temporarily disconnects the customer. When the interaction reaches the beginning of the queue 214(1-n) and there is an agent station 127(1-n) ready in the agent group 202, 204, 206 an outbound call is dialed to the customer and the customer can be connected to the agent station 127(1-n).

For on time scheduling, the customer is called back at a determined time in the future assuming that there are enough ready agent stations 127(1-n) at that time. There can be several outcomes of suggesting a callback to a customer waiting in the queue: the customer rejects the callback and continues to stay in the queue in active status the customer selects an ASAP callback; or the customer selects on time callback. If the customer agrees to have a callback that can increase a probability that he answers the callback dialed to him at the determined time.

For ASAP and on-time callbacks, the router 120(1-n) sends the outbound calls and monitors the result of the call (328). For example, the router 120(1-n) determines whether or not the callback was answered by the customer (330). A percentage of successfully answered callbacks can be referred to as a hit rate. If the callback is not answered, the router 120(1-n) can use a lower value for the hit rate in the logic of the callback offering (332), e.g., to balance the risks of offering a callback and minimize an overall probability of losing a customer. For example, the router 120(1-n) can delay a callback offer which can increase a risk of abandonment but lower a risk of losing the customer because of a non-answered callback. In other examples, the contact center 115 may lose a customer if the customer rejects the callback and later abandon the interactions, or the customer answers the callback but abandons the interaction when he continues to stay in the queue while waiting for an agent. Additionally or alternatively the hit rate can be decreased when those events occur. A goal of the callback pacing by the router 120(1-n) is to reduce a total number of customers abandoning the interactions. Doing this can improve the customer satisfaction and increase the contact center 115 efficiency. Using the hit rate, the contact center 115 can measure and/or predict a probability of the customers answering the callbacks, and modify procedures to serve callbacks successfully by not letting the customer wait too long to avoid the interaction being abandoned. e.

When the customer answers the callback the router 120 (1-n) maintains the interaction in its place in the queue 214(1-n), changes the call status from virtual to real, and the customer awaits an available agent station 127(1-n). In some implementations the callback occurs when an agent station 127(1-n) is immediately available. In other implementations the callback occurs when the interaction is next to be addressed in the queue 214(1-n) or within a determined wait time of being next to be addressed in the queue 214(1-n). If the wait time for an available agent station 127(1-n) is not greater then, e.g., is equal to or less than, the customer patience time (336) the call is routed to an agent station 127(1-n) and a success rate is increased (338). If the wait time for an available agent station 127(1-n) is greater than the customer patience time (336) the call is abandoned and an abandonment rate is increased (340) or the success rate is decreased. Based on an implementation the hit rate, abandonment rate, success rate, etc. are tracked by one or more types of rate. The hit rate, abandonment rate, success rate need not be separate.

Figure 4:
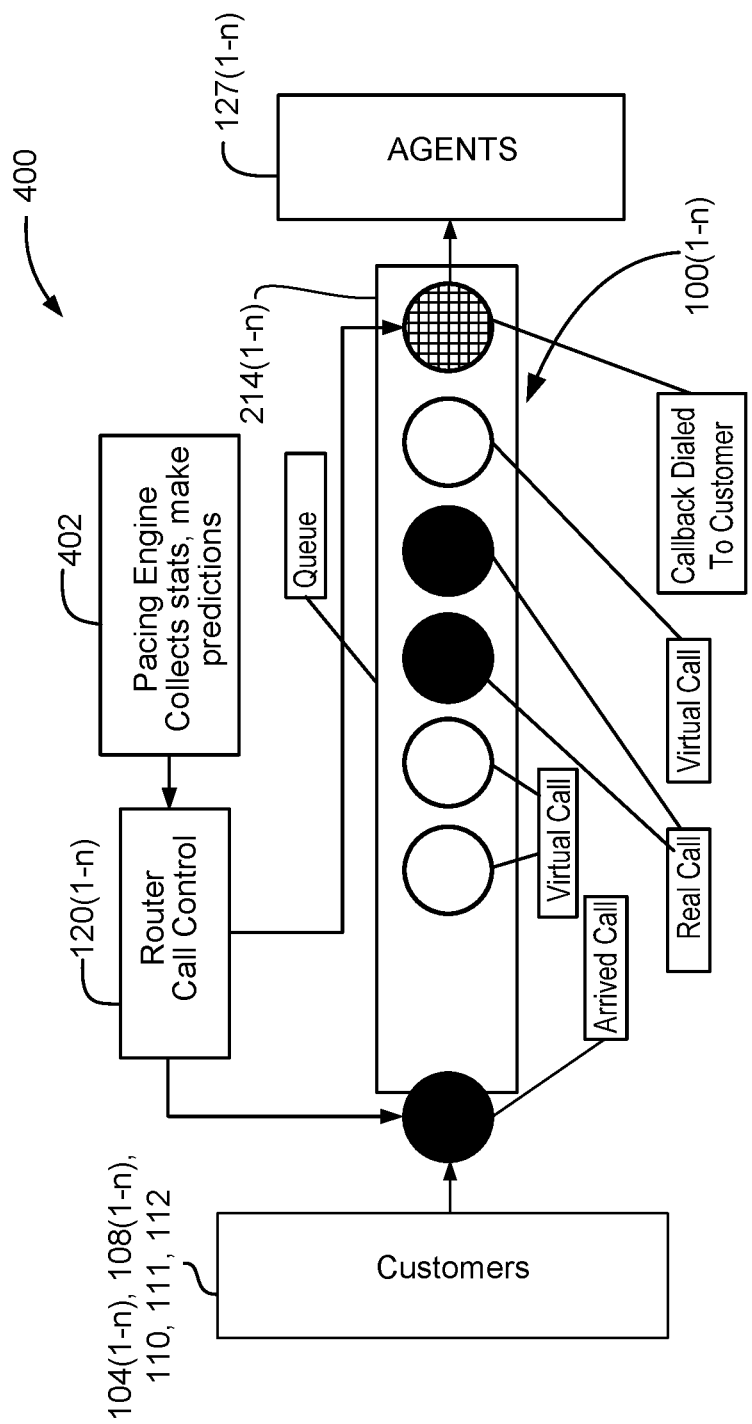
FIG. 4 is a block diagram of an example callback schema.

FIG. 4 is a block diagram 400 of an example callback schema. The call center 115 places interactions 100(1-n) from land-line devices 104(1-n), IP-enabled devices 108(1-n), mobile devices 110, 111, 112, and/or postal mail 150 in a queue 214(1-n). The router 120(1-n) can include, and/or be connected to, a pacing engine 402 which collects statistics and makes predictions about good candidate interactions for a callback. The router 120(1-n) can convert real calls to virtual calls when a call, or other type of interaction, is selected for a callback. The router 120(1-n) can convert the virtual call to a real call, or other type of interaction, when the callback occurs. The real calls and virtual calls can maintain their places in the queue as the make their way to the agent stations 127(1-n).

The pacing engine 402 can take into consideration one or more of the following parameters when suggesting a callback. Patience time (PT) threshold of the customer includes the time that a customer is willing to stay in the queue until abandonment of the interaction. There are different types of PT: PT for customers that are not suggested callbacks (PT1), PT for customers that are suggested callbacks but they rejected them (PT2), PT for customers that are suggested callbacks they accepted and then were placed into the queue again after answering callback outbound calls (PT3). The pacing engine 402 can vary the PT threshold based on a time, e.g., based on the time of day, the time of week, the time of month, the time of year, holidays, etc. The pacing engine 402 can also consider the dependence of these PTs on certain customers and the system parameters including the customer profile information (gold, silver or bronze customer), urgency of a call, time of the day, week and so on.

Additionally or alternatively, another parameter is hit rate (HR). Like PT this parameter may also depend on some other parameters of a customer and the system. Additionally or alternatively, another parameter is estimated wait time (EWT) which includes the time that a customer waits in the queue until he is transferred to an agent. When EWT is relatively short and the customer is a higher priority or has an urgent call, the pacing engine 402 may not suggest a callback and keep the customer in the queue. In an opposite situation when EWT is long and the customer has lower priority, the pacing engine 402 can suggest a callback and temporarily lessen load to the agent stations 127(1-n). Other types of parameters may be used depending on an implementation.

To estimate a time to dial callbacks to the customers, the pacing engine 402 can determine that even if all agent stations 127(1-n) are busy when a callback is answered by a customer, the customer can wait while the call stays in the queue for a certain time. A callback mode with scheduled time interval allows the contact center 115 to tune for minimizing risk of abandonment of callback waiting in queue too long. This and other factors can differ from typical outbound pacing algorithms. For example, the pacing engine 402 can also work in a blended environment when outbound calls are mixed with inbound calls. The pacing engine 402 can take into consideration not only the availability of a certain number of callbacks but also their order in the queue. The callback that arrived earlier to the queue is connected to the agent station 127(1-n) sooner than those that arrived later. In regular outbound campaigns the phone numbers to dial may be selected in arbitrary order.

The pacing engine 402 can use a more complex model than for outbound campaigns where analytical solution is less applicable. For example, the pacing engine 402 can ensure that the callback is not too soon after the original call so that the customer is not waiting too long a time for an available agent station 127(1-n), and/or too late so that the customer does not lose interest or try to call again. The pacing engine 402 can also ensure that the agent devices 127(1-n) are occupied so that the agent devices 127(1-n) are not sitting idle for too long while waiting for an answered callback. Therefore, the customer wait time can be minimized and the agent stations 127(1-n) can be kept busy. The pacing engine 402 can use simulation to estimate an optimal time to dial a callback. The simulation can provide a precise and flexible way for actual callback offerings and for dialing the callback, e.g., by having preferred and less preferred times for the callback, and the contact center 115 offering the callback to the customer before making the actual callback.

Additionally or alternatively, the pacing engine 402 can optimize when to offer callback to the customer waiting in the queue 214(1-n), e.g., by balancing risks of abandonment of the interaction by the customer in queue 214(1-n) versus risk of unsuccessful callback. The contact center 115 can inform the customer of the estimated wait time, e.g., that the time a callback is to be made matches an estimated wait time. Additionally or alternatively, the contact center 115 can inform the customer of a callback time based on a personized message to the customer, e.g. with a customer's preferred times from history, an impact of external events, etc. The pacing engine 402 can also consider office hours when determining a callback time, e.g., an end of business time. The pacing engine 402 can determine the callback time and/or ensure that the promised callback is kept, e.g., by mixing virtual and real calls in queue 402. Additionally or alternatively, the callback time can be determined according to set business priorities and a time of the original request.

Additionally or alternatively, the pacing engine 402 can determine a callback time by predicting future traffic to the agent devices 127(1-n), e.g., by leveraging workforce management (WFM) tools of the contact center 115. The contact center 115 can schedule outbound campaigns to blend with ad-hoc callbacks. The callback attempts can be repeated if unsuccessful based on rules established with the pacing engine 402. The rules can be established dynamically. In the mobile environment, the pacing engine 402 can leverage a customer's presence information if determinable, e.g., by handshaking with the mobile device 110, 111, 112 for a best time for a callback. The pacing engine 402 can also leverage information from a calendar of the mobile device 110, 111, 112, for example, to schedule a future callback. If customer is busy at the scheduled callback time, the pacing engine 402 can send a text message to the customer to request a new callback time and/or update the callback time. Additionally or alternatively, the pacing engine 402 can leverage other ongoing interactions 100(1-n) of customer with contact center 115. For example, the agent device 127(1-n) can address open issues with other interactions at the time of the callback for the interaction 100(1-n).

Figure 5:
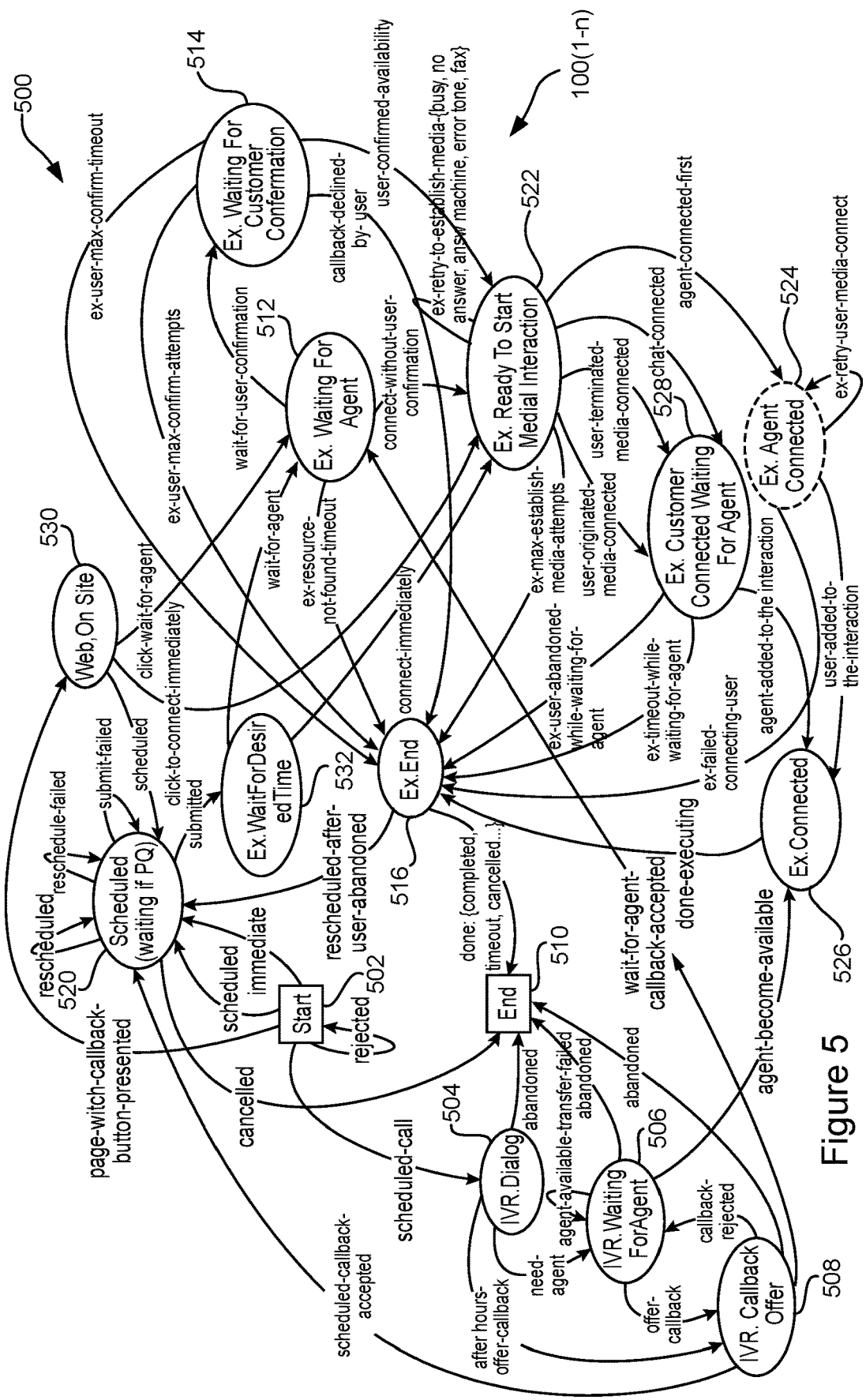
FIG. 5 is a state diagram including examples of different states for the interactions.

FIG. 5 is a state diagram 500 including examples of different states for the interactions 100(1-n). As illustrated, there is a complex set of states that the pacing engine 402 considers to determine when to suggest a callback and/or determine a callback time as the interactions 100(1-n) make their way to the agent device 127(1-n) to be acted on by the agent devices 127(1-n). At the start (502) in one example the interaction 100(1-n) can be sent to the IVR server 119 to provide an IVR dialog 504 with the customer. The pacing engine 402 can decide to handle the interaction immediately, schedule a callback, send the call to the IVR server 119 or the suggestion can be rejected. The IVR server 119 can wait (506) to transfer the customer to an available agent station 127(1-n) and/or offer a callback option to the customer (508), e.g., based on a determination by the pacing engine 402. The interaction can be abandoned, the customer may request an agent, or the customer can accept an after-hours or other type of callback. If at any time the customer abandons the call, the progress of the interaction can end (510).

When the callback option is provided, the interaction 100(1-n) waits for an available agent station 127(1-n) (512). The pacing engine 402 can wait for customer confirmation, connect the customer without customer confirmation, or the call can timeout. In one example, the interaction 100(1-n) can wait for confirmation by the customer to accept a call 514. The pacing engine 402 can determine whether the confirmation times out, whether the customer confirms availability, whether to connect without a confirmation of availability, or whether a maximum number of confirmation attempts is exceeded. The confirmation attempts can end 516 or a new interaction time can be scheduled 520. Scheduled callbacks can be rescheduled, the reschedule callback can fail, or the callback can be successfully submitted. When the customer confirms availability a media interaction between the contact center 115 and the customer can begin 522. The pacing engine 402 can connect the agent device 127(1-n) first, a recommended chat can be connected, a media can be connected based on a customer termination of the interaction, a media can be connected as initiated by the customer, a maximum number of attempts to connect to the media can be exceeded, etc. The agent device 127(1-n) can added to the interaction 100(1-n) first 524 or the customer can be added to the interaction 100(1-n) 526. If the customer initiates a connection 528, the agent device 127(1-n) can then be connected to the interaction (1-n) 526. The customer and the agent device 127(1-n) can also connect through other media, e.g., a website on the Internet 530. When a callback, e.g., via voice, chat, email, the website, etc. is scheduled, 520, the contact center 115 waits for the determined time to execute the callback 532.

Figure 6:
FIG. 6 is a chart of example scenarios for handling interactions between the contact center and customers.

FIG. 6 is a chart 600 of example scenarios for handling interactions between the contact center 115 and customers. The routers 120(1-n) and the pacing engine 402 can determine how to handle callback of interactions 100(1-n) based on scenarios that need immediate attention 602, that need attention as soon as possible 604, and that can be scheduled 606 for future handling, etc. Customers can be interacted with using different channels including but not limited to the web 608, mobile 610 and land-line 612, etc. In the immediate scenarios 602, the web 608 and mobile 610 can be used for callbacks, customer inbound communications, e.g., the contact center 115 gives the customers a callback number and/or time, and callback chats with the customer. In the as soon as possible scenario 604, the land-line 612, the mobile 610 and the web 608 can be used for callbacks, and mobile 610 and the web 608 can be used for inbound and chats. In the scheduled scenario 606, the land-line 612, mobile 610 and web 608 can be used for callbacks, and mobile 610 and the web 608 can be used for inbound callbacks.

The pacing engine 402 can use the type of queue 214(1-*n*) and/or a determined priority of the interaction (e.g., based on an SLA) to help categorize the interaction as immediate, as soon as possible or scheduled. The later interaction may be via a different channel than initial interaction. For example, if the initial interaction was a chat, the interaction back may be performed by voice. This can also apply also to email, e.g. by generating a reception confirmation with dynamically adjusted SLA commitment ("will respond by . . . "). The type of interaction back can be based on a customer indicated preference, a time of time of the callback, etc.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud, for example using AMAZON AWS and other products or services.

While various embodiments have been described, it can be apparent that many more embodiments and implementations are possible. Accordingly, the embodiments are not to be restricted.

The invention claimed is:

1. A system, comprising:
a processor and a memory, wherein the memory stores instructions, which when executed by the processor, cause the processor to:
receive a first request for a first interaction from a first customer device accessible to a first customer;
receive a second request for a second interaction from a second customer device accessible to a second customer;
store data about the first and second interactions in a data structure, the stored data identifying a state of the first and second interactions as being in a first state;
determine a patience time threshold for the first and second customers based on a type of interaction determined for each of the first and second interactions and a time of the request determined for each of the first and second interactions;
determine, based on the determined patience time threshold for the first interaction, that a callback is to be suggested to the first customer;
categorize priority of the first interaction as a first type or a second type, in response to determining that a callback is to be suggested to the first customer;
in response to determining that the priority of the first interaction is a first type:
  modify the state of the first interaction stored in the data structure from the first state to a second state;
  monitor advancement of the first interaction in the data structure;
  initiate the callback in response to determining that the first interaction has advanced to a particular location in the data structure;
  in response to initiating the callback, modify the state of the first interaction stored in the data structure from the second state back to the first state;
in response to determining that the priority of the first interaction is a second type:
  automatically identify a time for scheduling the callback, wherein the identified time is based on preferred times of the first customer from history of previous interactions, and predicted traffic to agent devices;
  transmit a request to schedule the callback at the identified time;
  in response to acceptance of the request to schedule the callback, wait for the identified time to execute the callback, wherein after transitioning the first interaction to the second state, the first interaction is maintained in the data structure with the second interaction; and
  execute the callback at the detected time, wherein the callback is an outbound interaction to the first customer;
  monitor results of the callback;
  in response to the first customer answering the callback, transition the first interaction from the second state back to the first state;
  maintain the first interaction that has transitioned back to the first state, in the queue until a first agent is available; and route the first interaction that has transitioned back to the first state, to a first agent device in response to the first agent being available;

route the second interaction to a second agent device without executing a second callback.

2. The system of claim 1, wherein the data structure is a queue, and the first state is indicative that the first interaction is a real interaction with the first customer waiting to be connected to a live agent, and the second state is indicative that the first interaction is a virtual interaction waiting for the callback.

3. The system of claim 1, wherein the instructions that cause the processor to categorize of the priority of the first interaction as the first type is indicative that the callback is to be executed as soon as possible, and the instructions that cause the processor to categorize the priority of the first interaction as the second type is indicative that the callback is to be scheduled for future handling.

4. The system of claim 1, wherein the instructions that cause the processor to automatically identify time, include instructions that cause the processor to identify the time based on presence information of the first customer.

5. The system of claim 1, wherein the instructions that cause the processor to automatically identify time, include instructions that cause the processor to access a calendar of the first customer from the customer device.

6. A method comprising:

receiving a first request for a first interaction from a first customer device accessible to a first customer;

receiving a second request for a second interaction from a second customer device accessible to a second customer;

storing data about the first and second interactions in a data structure, the stored data identifying a state of the first and second interactions as being in a first state;

determining a patience time threshold for the first and second customers based on a type of interaction determined for each of the first and second interactions and a time of the request determined for each of the first and second interactions;

determining, based on the determined patience time threshold for the first interaction, that a callback is to be suggested to the first customer;

categorizing priority of the first interaction as a first type or a second type, in response to determining that a callback is to be suggested to the first customer;

in response to determining that the priority of the first interaction is a first type:

modifying the state of the first interaction stored in the data structure from the first state to a second state;

monitoring advancement of the first interaction in the data structure;

initiating the callback in response to determining that the first interaction has advanced to a particular location in the data structure;

in response to initiating the callback, modifying the state of the first interaction stored in the data structure from the second state back to the first state;

in response to determining that the priority of the first interaction is a second type:

automatically identifying a time for scheduling the callback, wherein the identified time is based on preferred times of the first customer from history of previous interactions, and predicted traffic to agent devices;

transmitting a request to schedule the callback at the identified time;

in response to acceptance of the request to schedule the callback, waiting for the identified time to execute the callback, wherein after transitioning the first interaction to the second state, the first interaction is maintained in the data structure with the second interaction;

executing the callback at the detected time, wherein the callback is an outbound interaction to the first customer;

monitoring results of the callback;

in response to the first customer answering the callback, transitioning the first interaction from the second state back to the first state;

maintaining the first interaction that has transitioned back to the first state, in the queue until a first agent is available; and routing the first interaction that has transitioned back to the first state, to a first agent device in response to the first agent being available; and routing the second interaction to a second agent device without executing a second callback.

7. The method of claim 6, wherein the data structure is a queue, and the first state is indicative that the first interaction is a real interaction with the first customer waiting to be connected to a live agent, and the second state is indicative that the first interaction is a virtual interaction waiting for the callback.

8. The method of claim 6, wherein the categorizing of the priority of the first interaction as the first type is indicative that the callback is to be executed as soon as possible, and the categorizing of the priority of the first interaction as the second type is indicative that the callback is to be scheduled for future handling.

9. The method of claim 6, wherein the automatically identifying of the time includes identifying the time based on presence information of the first customer.

10. The method of claim 6, wherein the automatically identifying of the time includes accessing a calendar of the first customer from the customer device.

* * * * *